(12) United States Patent
Sich (10) Patent No.: US 8,663,052 B2
(45) Date of Patent: Mar. 4, 2014

(54) INFINITELY VARIABLE TRANSMISSION DEVICE OF A DRIVE TRAIN OF A VEHICLE

(75) Inventor: Bernhard Sich, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 211 days.

(21) Appl. No.: 12/933,689

(22) PCT Filed: Mar. 11, 2009

(86) PCT No.: PCT/EP2009/052814
§ 371 (c)(1),
(2), (4) Date: Sep. 21, 2010

(87) PCT Pub. No.: WO2009/130084
PCT Pub. Date: Oct. 29, 2009

(65) Prior Publication Data
US 2011/0021303 A1 Jan. 27, 2011

(30) Foreign Application Priority Data
Apr. 23, 2008 (DE) .......................... 10 2008 001 326

(51) Int. Cl.
*F16H 37/02* (2006.01)
(52) U.S. Cl.
USPC ........... 475/211; 475/207; 475/210; 475/214; 475/215
(58) Field of Classification Search
USPC .................. 475/211, 216, 207, 210, 217, 215
See application file for complete search history.

(56) References Cited

U.S. PATENT DOCUMENTS

| 4,599,916 | A | | 7/1986 | Hirosawa |
| 5,564,998 | A | | 10/1996 | Fellows |
| 5,643,121 | A | * | 7/1997 | Greenwood et al. ............ 475/72 |
| 6,045,477 | A | | 4/2000 | Schmidt |
| 6,056,661 | A | * | 5/2000 | Schmidt ........................ 475/210 |
| 6,293,888 | B1 | | 9/2001 | Moon |
| 2006/0183590 | A1 | | 8/2006 | Jackson |

FOREIGN PATENT DOCUMENTS

| DE | 34 08 543 A1 | 9/1984 |
| DE | 694 02 410 T2 | 7/1997 |
| DE | 10 205 752 A1 | 2/2003 |

(Continued)

OTHER PUBLICATIONS

German Search Report dated Nov. 22, 2012.

(Continued)

*Primary Examiner* — Derek D Knight
(74) *Attorney, Agent, or Firm* — Davis & Bujold, PLLC; Michael J. Bujold (57) ABSTRACT

An infinitely variable transmission device (4) for a vehicle drivetrain (1) which includes a variator (8) and a gearshift transmission device (9), which produce gear ratios in a plurality of ratio ranges with continuous variation. The device has a planetary transmission device (7) in active connection with a transmission input (12), in an area of a first shaft (11), with the gearshift transmission device (9), in an area of a second shaft (14), and with the variator (8), in an area of a third shaft (16). The torque to be transmitted by the transmission device (4) passes, via at least two power paths, between the transmission input (12) and a transmission output (10). The variator (8) is arranged in one of the two power paths and the gearshift transmission device (9) is arranged between the variator (8) and the transmission output (10).

17 Claims, 9 Drawing Sheets

(56) References Cited

FOREIGN PATENT DOCUMENTS

| | | |
|---|---|---|
| DE | 10 2005 054 720 A1 | 5/2007 |
| EP | 1 528 285 A2 | 5/2005 |
| JP | 200151587 A | 9/2001 |
| JP | 2006226483 A | 8/2006 |

OTHER PUBLICATIONS

Japanese Office Action issued in corresponding Japanese Application No. 2011-505441 mailed Jul. 30, 2013.

* cited by examiner

INFINITELY VARIABLE TRANSMISSION DEVICE OF A DRIVE TRAIN OF A VEHICLE

This application is a National Stage completion of PCT/EP2009/052814 filed Mar. 11, 2009, which claims priority from German patent application serial no. 10 2008 001 326.9 filed Apr. 23, 2008.

FIELD OF THE INVENTION

The invention concerns an infinitely variable transmission device for a drivetrain of a vehicle, with a variator and a gearshift transmission unit.

BACKGROUND OF THE INVENTION

From US 2006/0183590 A1 an infinitely variable transmission device with power branching is known. The power splitting takes place by virtue of a planetary transmission device arranged on the transmission input side, a first power path of the transmission device being supplied with torque by a sun gear of the planetary transmission device and a second power path by a ring gear of the planetary transmission device. The sun gear of the planetary transmission device is actively connected with a first shaft of the variator by spur gearteeth. A second shaft of the variator is connected to a gearshift transmission device in this case made as a countershaft transmission. In their region the torques transmitted along the two power paths of the transmission device are summed and passed out of the transmission device via a transmission output.

Disadvantageously, this transmission device occupies a lot of structural space since the gearshift transmission device is arranged between the planetary transmission device and the variator. In addition the active connection between the sun gear of the planetary transmission device and the first variator shaft has to be formed by an undesirably long connecting shaft, which can only be used by virtue of a bearing arrangement in the transmission device which is of elaborate design, giving rise to high manufacturing costs.

SUMMARY OF THE INVENTION

Accordingly, the purpose of the present invention is to make available an infinitely variable transmission device of simple structural design, which takes up little space and can be produced inexpensively.

The infinitely variable transmission device according to the invention for a vehicle drivetrain, with a variator and a gearshift transmission device, by means of which gear ratios in several ratio ranges can be produced with continuous variation, and with a planetary transmission device which, in the area of a first shaft is actively connected to a transmission input, in the area of a second shaft to a gearshift transmission device and in the area of a third shaft to the variator, such that torque to be transmitted can pass via at least two power paths between the transmission input and a transmission output, and the variator is arranged in one of the two power paths, has the gearshift transmission device arranged between the variator and a transmission output.

By virtue of the arrangement according to the invention of the gearshift transmission device between the variator and a transmission output, compared with the transmission device known from the prior art the active connection between the planetary transmission device and the variator can be made with a shorter connecting shaft, whose bearing arrangement is more simply designed and can be produced more cost-effectively.

In addition the infinitely variable transmission device according to the invention, by virtue of the proposed arrangement of the gearshift transmission device, is characterized by a more compact transmission structure compared with the known transmission device and therefore takes up less structural space.

In an advantageous further development of the infinitely variable transmission device according to the invention, the first shaft of the planetary transmission device is formed as a ring gear, whereby compared with the transmission device known from US 2006/0183590 A1 the transmission device according to the invention is characterized by improved gear ratio adaptation.

In other embodiments the variator of the infinitely variable transmission device according to the invention is made either as a belt-type or as a friction-wheel variator or some other variator structure, for example hydrostatic, whereby specific advantages of the different variator variants can be used depending on the application in each case, each adapted thereto. For example the variator is made as a friction-wheel variator when the requirements are such that a larger speed range has to be covered by the transmission device according to the invention.

An embodiment of the infinitely variable transmission device according to the invention, which can be produced inexpensively, has a simply designed structure and takes up little structural space, is characterized in that one of the variator shafts is arranged on a main transmission shaft, since torque to be passed via the transmission device can be transferred from the planetary transmission device to the variator without additional gearwheel stages.

In a further inexpensive embodiment of the infinitely variable transmission device according to the invention the gearshift transmission device is designed in part as a coil-type transmission unit, by means of which, compared with conventional gearshift transmission devices, at least the same number of gear ratio steps can be produced with a smaller number of gearwheels.

An also space-saving and inexpensive as well as simply designed embodiment of the infinitely variable transmission device according to the invention is characterized in that in one of the drive ranges the torque to be transmitted passes along only one of the power paths. Compared with transmission devices known from the prior practice this embodiment of the transmission device is also characterized by a smaller number of gearwheels.

In an advantageous further development of the infinitely variable transmission device according to the invention, the torque to be passed or transmitted via the infinitely variable transmission device according to the invention can be divided between the two power paths in the area of the planetary transmission device and summed together in the area of the gearshift transmission device.

An embodiment of the infinitely variable transmission device according to the invention, which can be made inexpensively and operated with good efficiency, is made with interlock-type shift elements provided for shifting between the drive ranges.

To be able to provide high starting torque particularly in a first drive range provided for a starting process, in an advantageous further development of the transmission device the active connection between the third shaft of the transmission device and the variator is formed with at least one spur gear stage.

BRIEF DESCRIPTION OF THE DRAWINGS

Other advantages and advantageous further developments of the invention emerge from the claims and from the example embodiments whose principle is described with reference to the drawings, in which, for the sake of clarity, the same indexes are used for structurally and functionally equivalent components when describing the example embodiments.

The drawing shows.

DETAILED DESCRIPTION OF THE PREFERRED EMBODIMENTS

Figure 1:
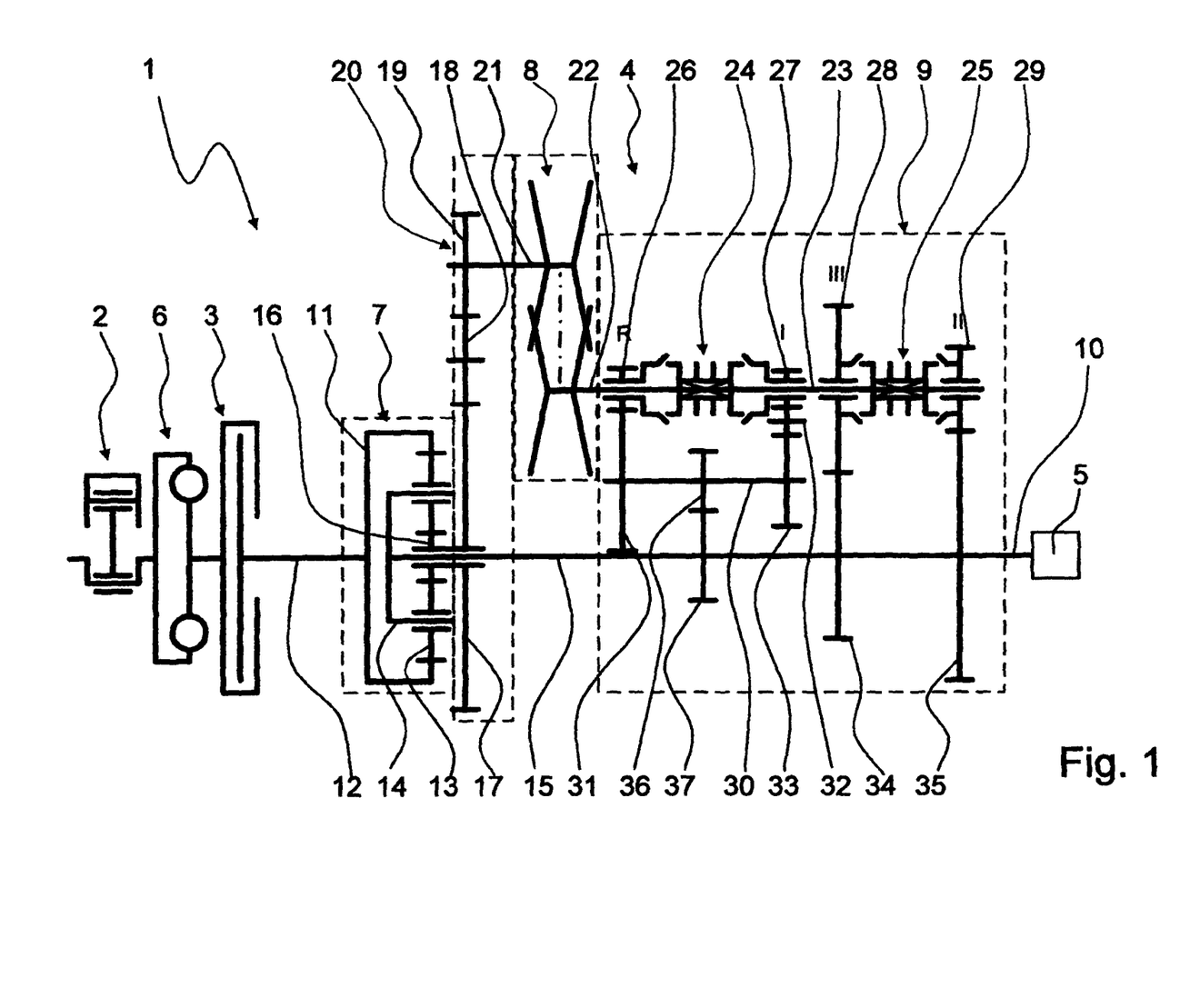
FIG. 1: Gearwheel layout of a first example embodiment of the infinitely variable transmission device according to the invention.

FIG. 1 shows in very schematic form a vehicle drivetrain 1, which comprises a drive machine 2, a starting element 3, a transmission device 4 and a drive output 5. Between the drive machine 2 and the starting element 3 in this case made as a friction clutch, there is arranged a so-termed oscillation damper 6 by means of which rotational irregularities of the drive machine 2, in this case an internal combustion engine, can be damped.

The transmission device 4 is designed as an infinitely variable, power-branched transmission comprising on the transmission input side a planetary transmission device 7 designed as a minus planetary gearset, and on the transmission output side a gearshift transmission device 9, the gearshift transmission device 9 being arranged between a variator 8, in this case made as a belt-type variator, and a transmission output 10 or the drive output 5 of the vehicle drivetrain 1.

A first shaft 11 of the planetary transmission device 7, in the form of a ring gear, is connected to the drive machine 2 via a transmission input shaft 12, the starting element 3 and the oscillation damper 6, whereby a drive torque from the drive machine 2 is passed into the transmission device 4 via the transmission input shaft 12 and the ring gear 11.

By means of planetary gears 13 that mesh with the ring gear 11 and a second shaft 14 of the planetary transmission device 7 in this case made as a planetary carrier, part of the drive torque from the drive machine 2 is passed on in the direction of the gearshift transmission device 9 to a main transmission shaft 15 connected in a rotationally fixed manner to the second shaft 14 of the planetary transmission device 7.

At the same time, via a third shaft 16 in this case formed as a sun gear and spur gearing 20 comprising three gearwheels 17, 18 and 19 that mesh with one another, the planetary transmission device 7 is actively connected to a first shaft 21 of the variator 8 in this case arranged a distance away from and parallel to the main transmission shaft 15.

A second shaft 22 of the variator 8 is connected to a countershaft 23 of the gearshift transmission device 9, on which are mounted and able to rotate a plurality of loose wheels 26 to 29 which can be connected in a rotationally fixed manner to the countershaft 23 by means of shift elements 24, 25. In this case the shift elements 24 and 25 are interlock-type shift elements which, depending on the application concerned, can preferably be claws, synchronizers, or combinations each comprising a claw clutch and an additional synchronizer.

The loose wheel 26 meshes with a gearwheel 31 that is connected in a rotationally fixed manner to another countershaft 30, while the loose wheel 27 meshes with an intermediate wheel which in turn is engaged with a gearwheel 33 also connected in a rotationally fixed manner to the other countershaft 30. In turn, the loose wheels 28 and 29 mesh with gearwheels 34, 35 that are connected in a rotationally fixed manner to the main transmission shaft 15. To the other countershaft 30 is connected in a rotationally fixed manner, an additional gearwheel 36, which meshes with a further gearwheel 37 that is connected rotationally fixed manner to the main transmission shaft 15.

With the transmission device 4 three drive ranges for forward drive and one drive range for reverse drive can be produced, such that the gear ratio ranges of these drive ranges can be moved through continuously by virtue of the variator 8 in this case designed as a belt-type variator. Switching between the drive ranges of the transmission device 4 is carried out by means of the two shift elements 24 and 25. For this, the first drive range for forward driving is engaged in the transmission device 4 when the loose wheel 27 is connected in a rotationally fixed manner to the countershaft 23 by the shift element 24. The second drive range is engaged in the transmission device 4 by connecting loose wheel 29 in a rotationally fixed manner to the countershaft 23 by means of the shift element 25, while the third drive range is available when the loose wheel 28 is connected in a rotationally fixed manner to the countershaft 23 by the shift element 25. The drive range for reverse drive is engaged in the transmission device 4 when the loose wheel 26 is connected in a rotationally fixed manner to the countershaft 23 by the shift element 24.

To be able to change the gear ratio of the transmission device 4 with continuous variation even when switching between the three drive ranges for forward driving, during a shifting process the variator is not necessarily put back, so that shifts between the drive ranges are not carried out synchronously.

Basically the above-described spatial arrangement of the planetary transmission device 7, the spur gearing 20 and the variator 8 in the transmission housing of the transmission device 4 can be chosen freely, such that the connection between the planetary transmission device 7 and the spur gearing 20 or between the planetary transmission device 7 and the variator 8 in the area of the third shaft 16 or sun gear of the planetary transmission device 7 takes place essentially in the same manner.

FIGS. 2 to 9 show further example embodiments of the transmission device 4, each of which differs in some areas of the transmission device 4 from the first example embodiment thereof shown in FIG. 1, and for that reason in the following description of FIGS. 2 to 9 in essence only the differences between the individual embodiments of the transmission device 4 will be described, while as regards the basic functional mode of the transmission device 4 reference can be made to the earlier description concerning FIG. 1.

Figure 2:
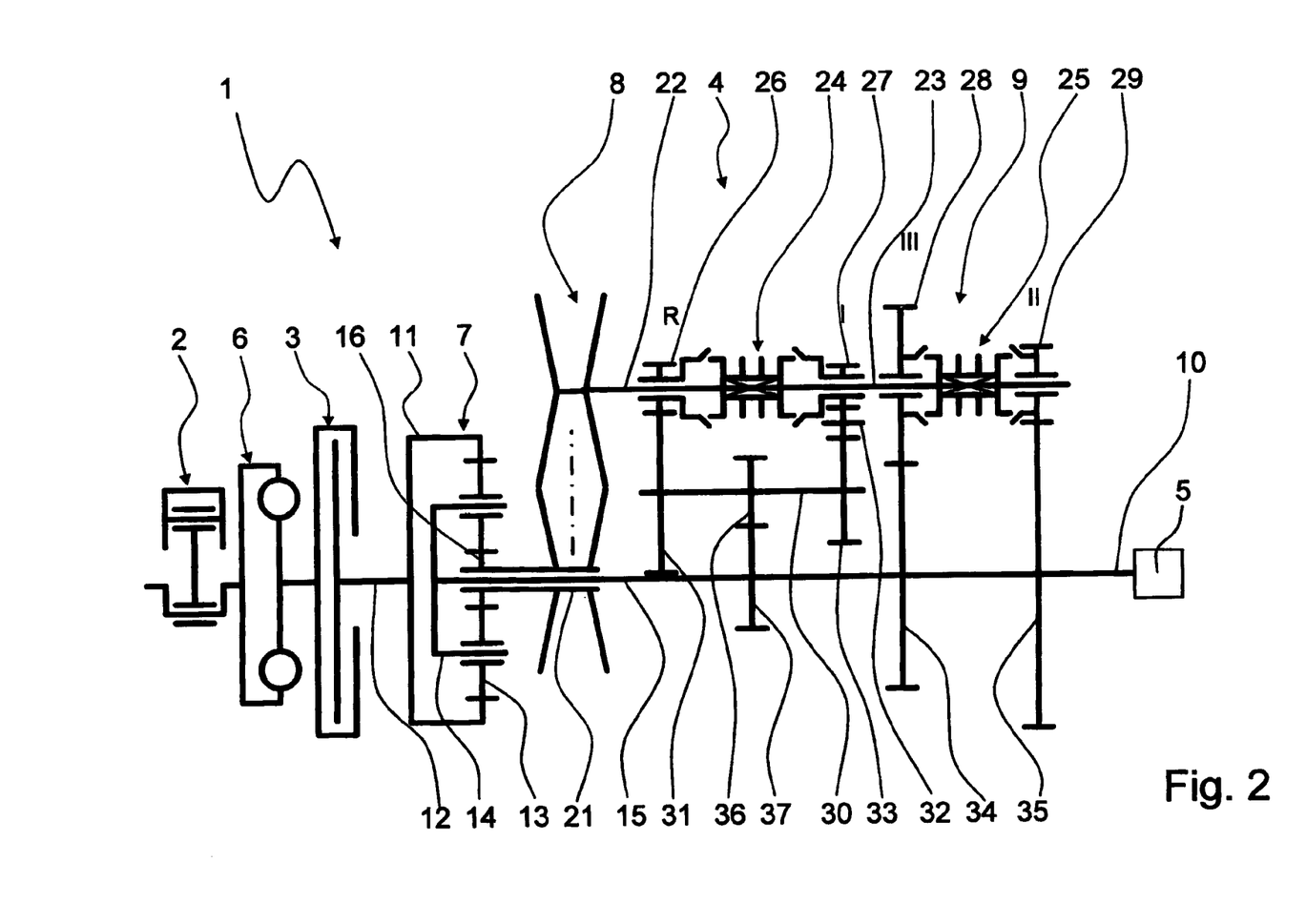
FIG. 2: A second example embodiment of the transmission device according to the invention, in which a shaft of the variator is arranged on a main transmission shaft.

In the example embodiment of the transmission device 4 shown in FIG. 2, the first shaft 21 of the variator 8 is arranged directly on the main transmission shaft 15 and connected to the third shaft 16 or sun gear of the planetary transmission device 7, so that the spur gearing 20 of the transmission device in FIG. 1 is not needed and the transmission device 4 of FIG. 2 occupies less structural space in the radial direction, is characterized by lower overall weight, and can be produced more cheaply.

Figure 3:
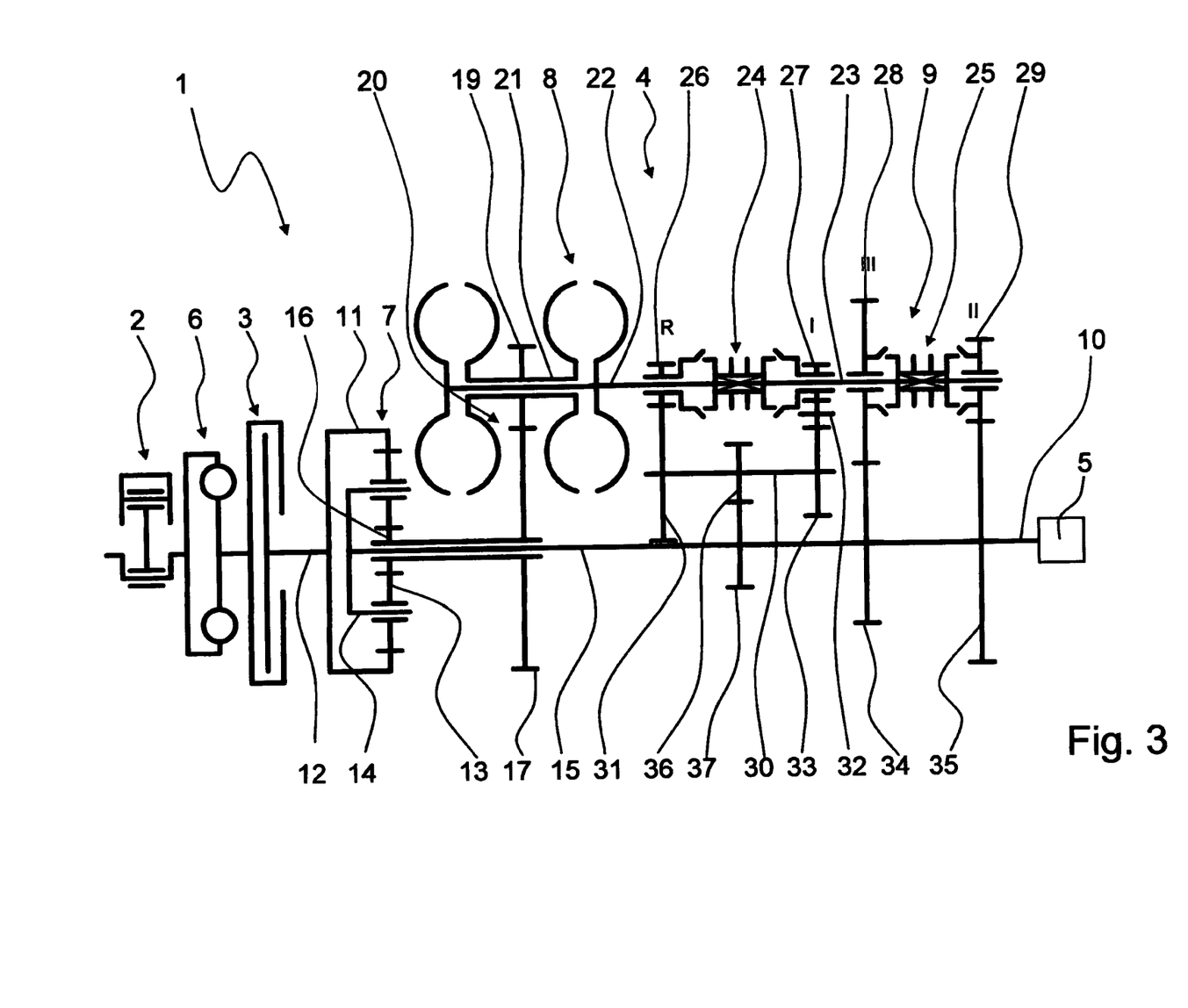
FIG. 3: Wheel layout of a third embodiment of the transmission device according to the invention, which comprises a friction-wheel variator.

In contrast to the two examples shown in FIGS. 1 and 2, the third embodiment of the transmission device 4 shown in FIG. 3 has a variator 8 formed as a friction-wheel variator, whose first shaft 21 and second shaft 22 are arranged coaxially to the countershaft 23. The spur gearing 20 that connects the third shaft 16 of the planetary transmission device 7 with the first shaft 21 of the variator 8 is made without the gearwheel or intermediate wheel 18, so that in the radial direction the transmission device 4 of FIG. 3 also takes up less space than the embodiment shown in FIG. 1.

Figure 4:
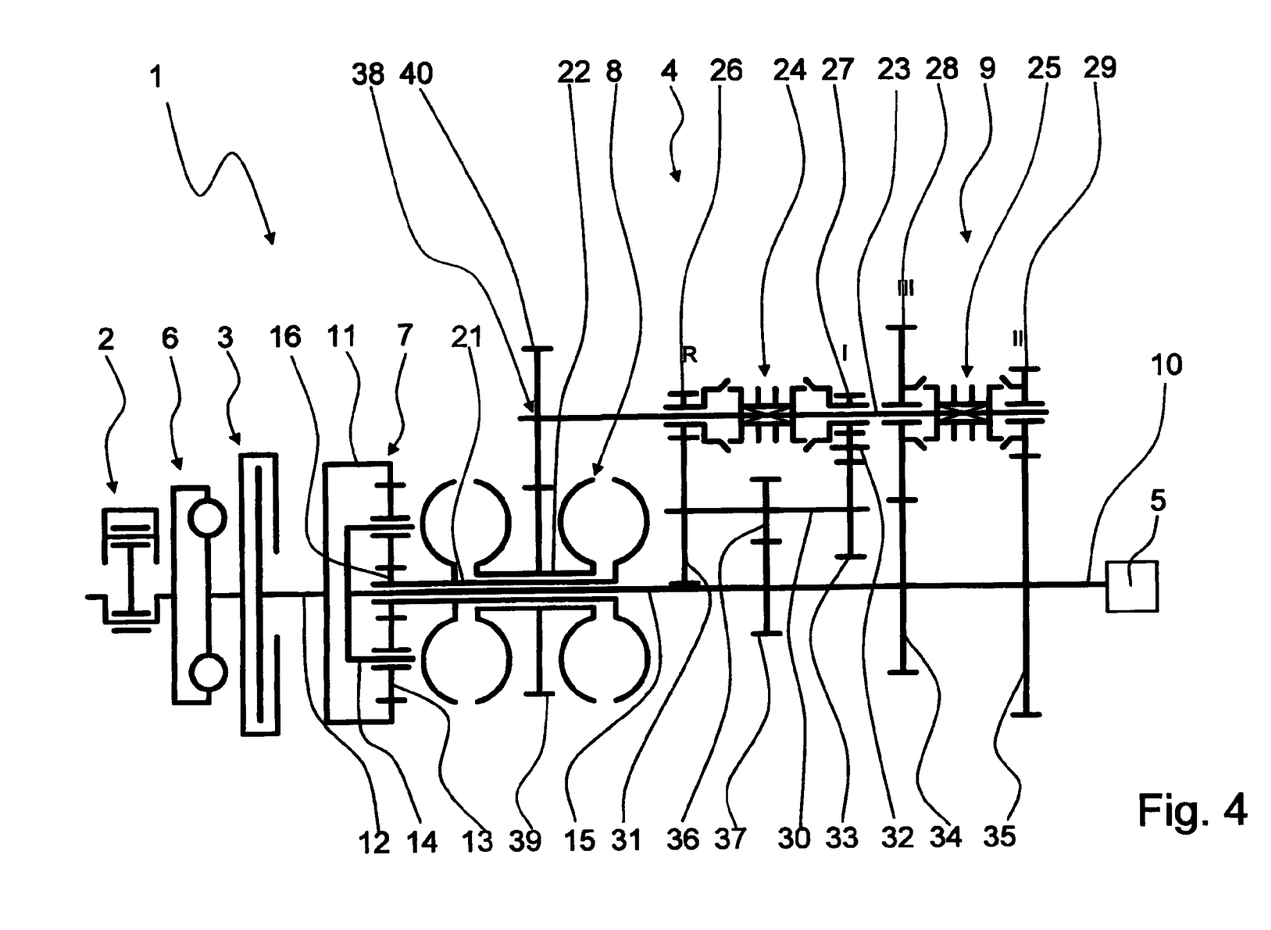
FIG. 4: A further example embodiment of the transmission device, represented as in FIG. 1, in which a shaft of the variator formed as a friction-wheel variator is arranged on the main transmission shaft.

The example embodiment of the transmission device 4 shown in FIG. 4 is also made with a friction-wheel variator, which is arranged on the main transmission shaft 15, and the second shaft 22 of the variator 8 is actively connected to the countershaft 23 of the gearshift transmission device 9 by further spur gearing comprising a first spur gear 39 and a second spur gear 40. Compared with the first example embodiment of the transmission device 4 shown in FIG. 1, this fourth example embodiment thereof is characterized by less need for space in the radial direction.

Figure 5:
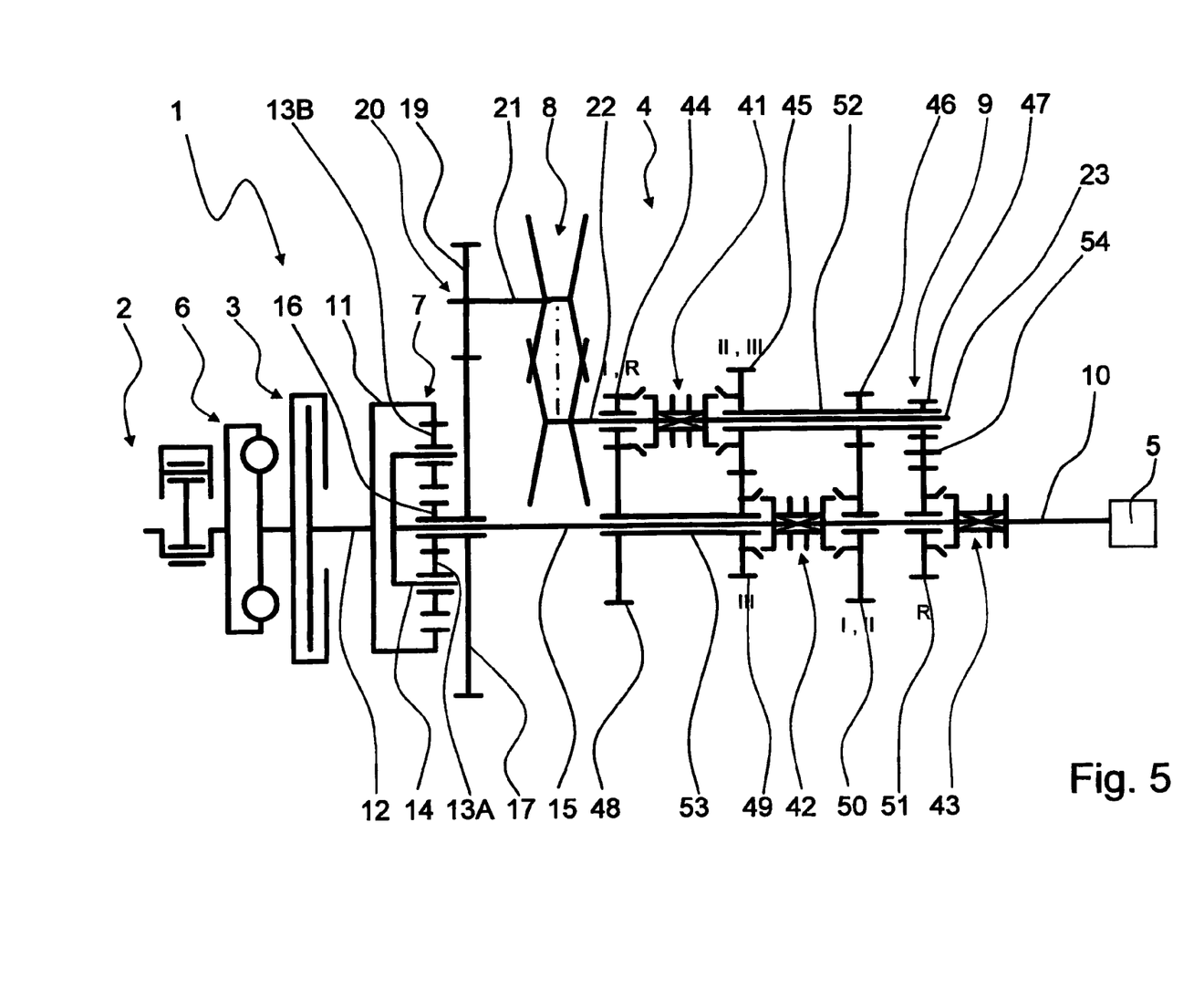
FIG. 5: Wheel layout of a fifth example embodiment of the transmission device, formed with a plus planetary gearset.

FIG. 5 shows a fifth example embodiment of the transmission device 4, in which the third shaft 16 of the planetary transmission device 7, which is designed as a plus planetary gearset, is connected to the first shaft 21 of the variator made as a belt-type variator, by means of the spur gearing 20 which, compared with the spur gearing 20 according to FIG. 1, is again made without the intermediate gear 18. In this case the planetary transmission device 7 comprises double planetaries 13A and 13B, in order to produce the rotation direction reversal realized by the intermediate wheel 18 already in the area of the planetary transmission device 7.

Furthermore, otherwise than the gearshift transmission devices 9 of the example embodiments of the transmission device 4 according to FIGS. 1 to 4, the gearshift transmission device 9 of FIG. 5 is designed with a coil-type transmission unit and with three shift elements 41, 42 and 43. By means of the shift element 41, loose wheels 44, 45, 46 and 47 arranged on the countershaft 23 can be connected in a rotationally fixed manner to the countershaft 23, while by means of the shift element 42 loose wheels 48, 49 and 50 arranged on the main transmission shaft 15 can be coupled to it in a rotationally fixed manner. The shift element 43 is provided in order to form a rotationally fixed connection between the loose wheel 51 arranged on the main transmission shaft 15 and the main transmission shaft 15. Both the loose wheels 45, 46 and 47 and also the loose wheels 48 and 49 are in each case connected in a rotationally fixed manner to one another by hollow shafts 52, 53, whereas the loose wheels 44 and 50 and 51 are made as separate gearwheels. The loose wheel 44 on the countershaft 23 meshes with the loose wheel 48 which is connected in a rotationally fixed manner by the hollow shaft 53 to the loose wheel 49, while the loose wheel 45 meshes with the loose wheel 49. The loose wheel 46 engages with the loose wheel 50 and the loose wheel 47 is actively connected to the loose wheel 51 via an intermediate wheel 54.

The first drive range for forward driving is engaged in the transmission device 4 when the loose wheel 44 is connected in a rotationally fixed manner by the shift element 41 to the countershaft 23 and at the same time the loose wheel 50 is connected in a rotationally fixed manner by the shift element 42 to the main transmission shaft 15. To engage the second drive range for forward driving in the transmission device 4, the loose wheel 45 has to be connected in a rotationally fixed manner by the shift element 41 to the countershaft 23 and the loose wheel 50 rotationally fixed by the shift element 42 to the main transmission shaft 15. The third drive range for forward driving is engaged in the transmission device 4 when the loose wheel 49 is connected in a rotationally fixed manner by the shift element 42 to the main transmission shaft 15 and the loose wheel 45 by the shift element 41 to the countershaft 23. When it is necessary to engage the drive range for reverse drive, the loose wheel 44 is connected in a rotationally fixed manner by the shift element 41 to the countershaft 23 and the loose wheel 51 by the shift element 43 to the main transmission shaft 15.

Figure 6:
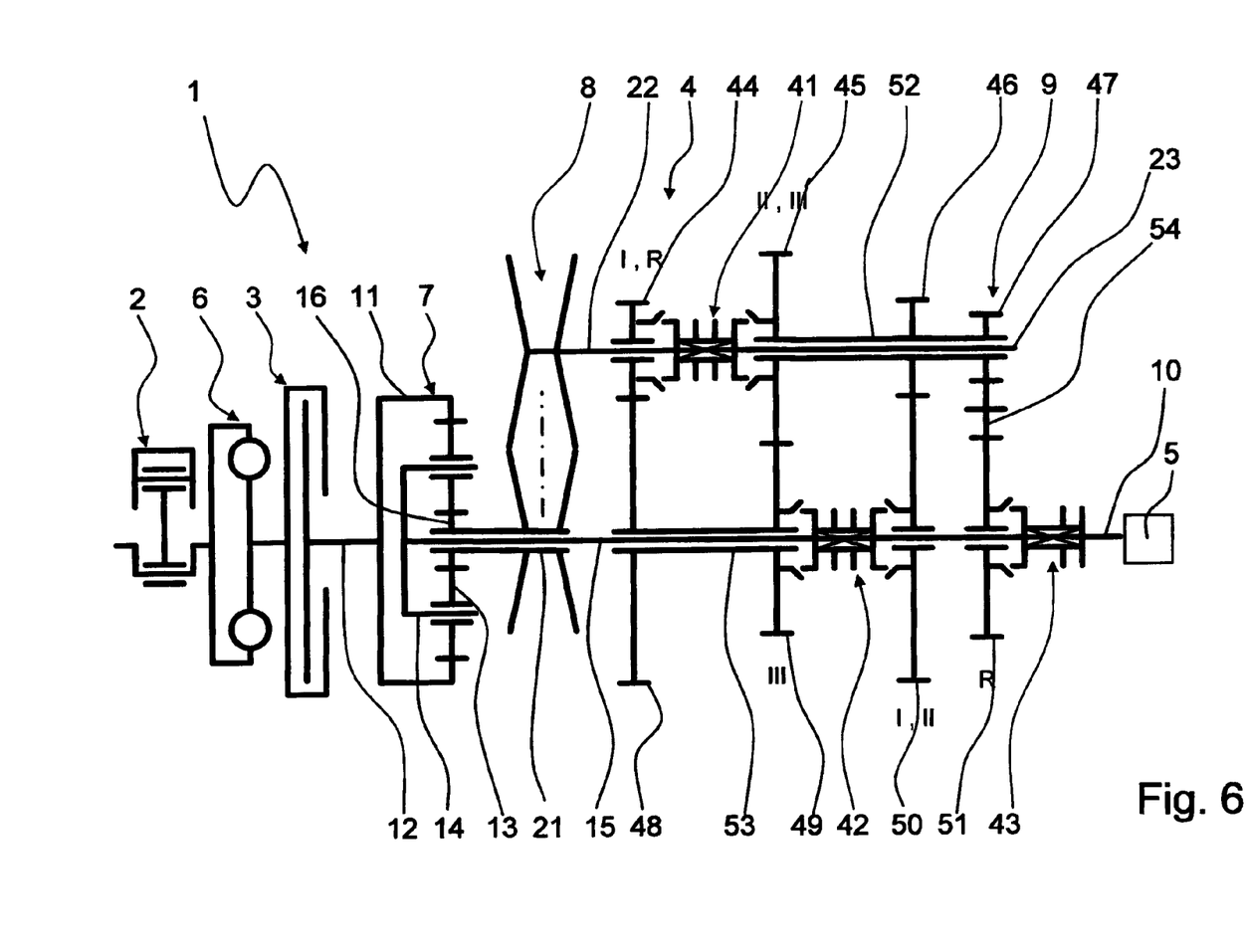
FIG. 6: A sixth example embodiment of the transmission device, in which a shaft of the variator is arranged on the main transmission shaft.

The sixth example embodiment of the transmission device 4 shown in FIG. 6 differs from the fifth example embodiment thereof in FIG. 5, in that the first shaft 21 of the variator 8 is arranged directly on the main transmission shaft 15 and the transfer of torque between the planetary transmission device 7 and the variator 8 takes place without the spur gearing 20, so that the embodiment of the transmission device 4 according to FIG. 6 takes up less structural space in the radial direction than the transmission device 4 of FIG. 5.

Figure 7:
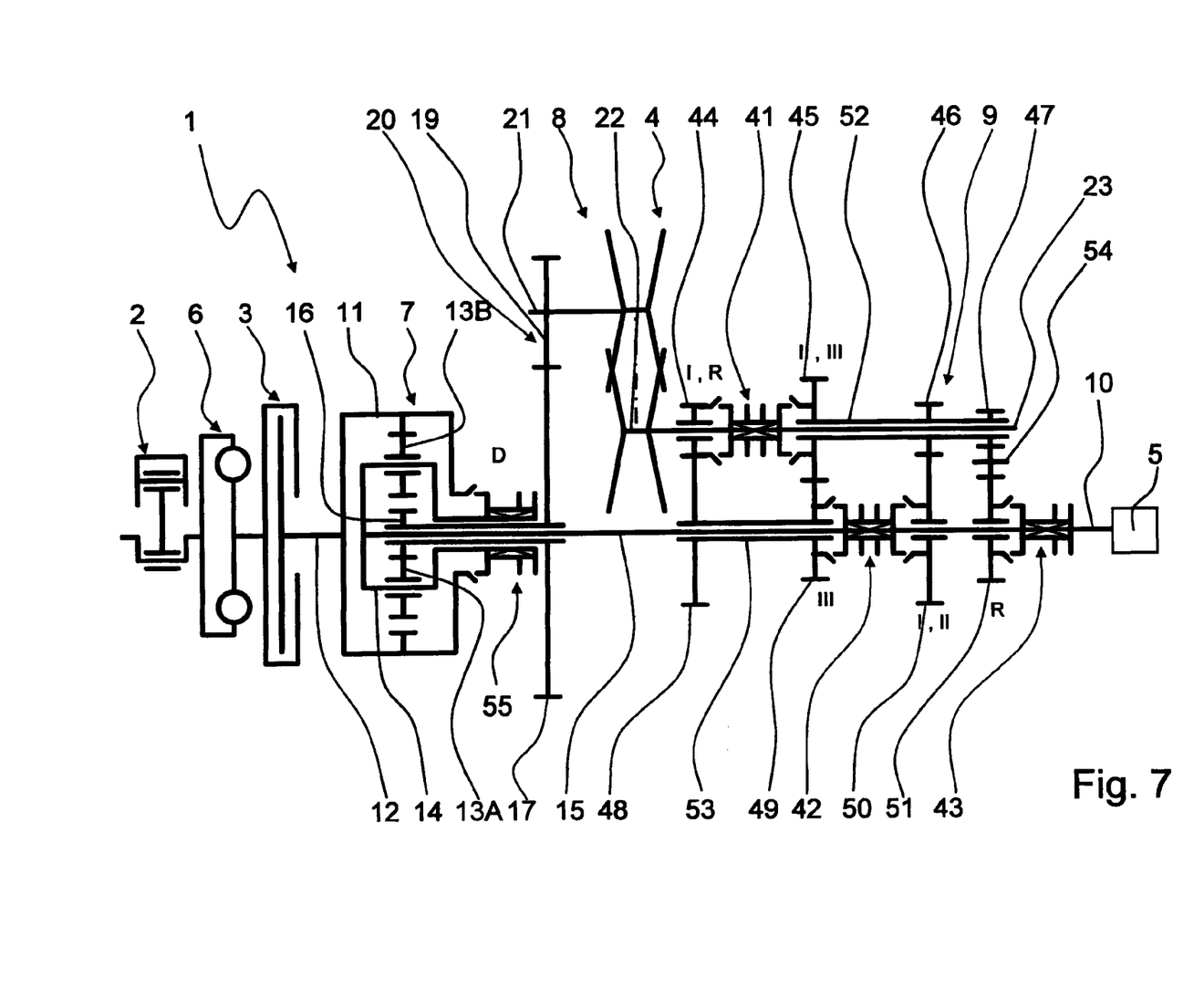
FIG. 7: Wheel layout of a seventh example embodiment, in which a ring gear and a planetary carrier of the planetary transmission device can be connected rotationally fixed to one another.

FIG. 7 shows a further development of the fifth example embodiment of the transmission device 4 shown in FIG. 5, such that in the transmission device according to FIG. 7 the first shaft 11 or ring gear of the planetary transmission device 7 can be connected in a rotationally fixed manner by a shift element 55 to the second shaft 14 or planetary carrier of the planetary transmission device 7. By virtue of the blocked planetary transmission device 7 or the locked input differential an additional, direct gear can be produced in the transmission device 4 in a simple and inexpensive manner.

Figure 8:
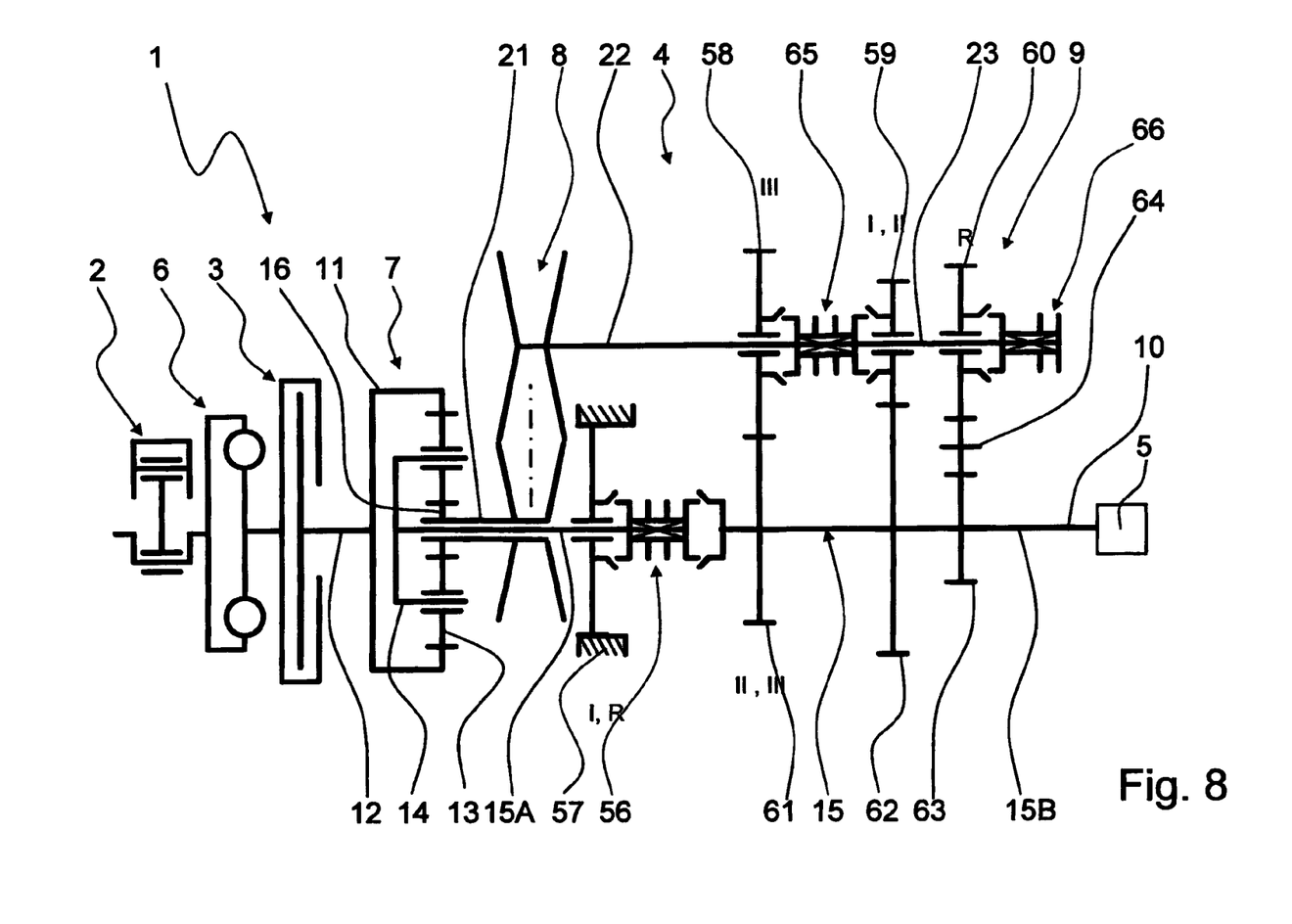
FIG. 8: Wheel layout of an eighth example embodiment of the transmission device according to the invention, in which a planetary carrier of the planetary transmission device can be made rotationally fixed.

The eighth example embodiment of the transmission device 4 shown in FIG. 8 is made with another version of the gearshift transmission device 9. In addition, the planetary carrier 14 of the planetary transmission device 7 can be brought into active connection by a shift element 56 with a component 57 fixed on the housing, and can thus be supported against the housing when the operating situation so requires, in order to be able to produce both the first drive range for forward drive and the drive range for reverse drive in the transmission device 4, in each case as direct gears without power branching. The planetary transmission device 7 is used as a fixed ratio and for this the planetary carrier 14 is connected in a rotationally fixed manner to the housing 57 of the transmission device 4.

To produce the drive ranges for forward drive and for revere drive, the gearshift transmission device 9 is made with a plurality of loose wheels 58, 59 and 60 arranged on the countershaft 23 and with three gearwheels 61, 62 and 63 arranged in a rotationally fixed manner on the main transmission shaft 15, the gearwheel 61 meshing with the loose wheel 58 and the loose wheel 59 with the gearwheel 62. The loose wheel 60 is actively connected with the gearwheel 63 via an intermediate wheel 64.

The loose wheels 58 and 59 can be connected in a rotationally fixed manner to the countershaft 23 by a shift element 65 and the loose wheel 60 by a further shift element 66, so that to produce the lowest or first drive range for forward drive, besides the rotationally fixed coupling of the planetary carrier 14 of the planetary transmission device 7 to the component 57 fixed on the housing, in addition the loose wheel 59 has to be connected in a rotationally fixed manner to the countershaft 23 by means of the shift element 65.

When a shift is called for to engage the second drive range for forward drive, which in all these example embodiments is the middle drive range, the first part 15A of the main transmission shaft 15 on the planetary transmission device side has to be connected in a rotationally fixed manner to the second part 15B of the main transmission shaft 15 in the area of the shift element 56. At the same time the loose wheel 59 has to be coupled by the shift element 65 to the countershaft 23, and in this shift position of the shift element 56, the planetary carrier 14 of the planetary transmission device 7 is uncoupled from the component 57 fixed on the housing.

To engage the third drive range for forward drive that comes after the second drive range in the transmission device 4 according to FIG. 8, the two parts 15A and 15B of the main transmission shaft 15 that can be uncoupled from one another in the area of the shift element 56 have to be connected in a rotationally fixed manner with one another and in addition the loose wheel 58 has to be connected in a rotationally fixed manner by the shift element 65 to the countershaft 23. To produce the drive range for reverse drive, the planetary carrier 14 has to be connected by the shift element 56 to the component 57 fixed on the housing and at the same time the loose wheel 60 is coupled by means of the shift element 66 to the countershaft 23.

In this shift position of the shift element 56, the main transmission shaft 15 is separated in the area of the shift element 56, so that the drive torque of the drive machine 2 transmitted by the transmission input shaft 12 is transferred completely by the variator 8 to the gearshift transmission device 9 and in the direction of the drive output 5, i.e. it is passed on without power branching.

Figure 9:
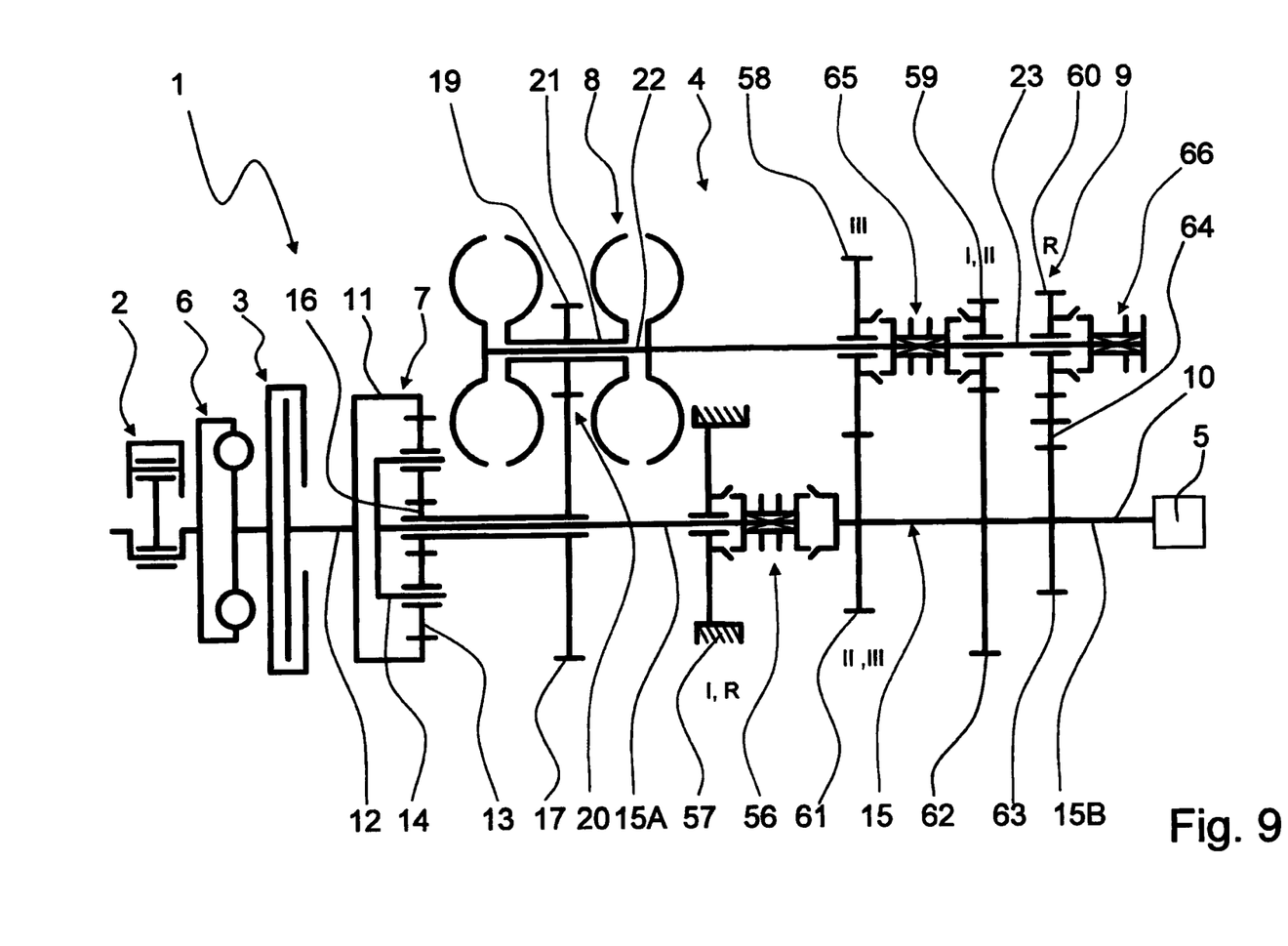
FIG. 9: A ninth example embodiment of the transmission device according to the invention, made with a friction-wheel variator

The ninth example embodiment of the transmission device 4 shown in FIG. 9 differs from the example embodiment thereof shown in FIG. 8 in the area of the variator 8, which is made as a friction-wheel variator and is arranged a distance away from the main transmission shaft 15 and coaxially with the countershaft 23.

All the example embodiments of the transmission device according to the invention shown in the drawing illustrate the principle of possible embodiments of an infinitely variable transmission with a number of drive ranges, which can be combined with high-torque utility vehicle engines. The use of belt-type variators, by means of which usually lower torques can be transmitted than those produced by utility vehicle engines, is made possible by the above-described power division in the area of the planetary transmission device.

Owing to the power branching and the approach that shifting in the transmission device between the drive ranges is carried out non-synchronously and, during the shift between two drive ranges, the variator is put back completely, the load in the area of the variator is reduced considerably compared with known infinitely variable transmissions without power branching.

Furthermore, the transmission device according to the invention can be operated with high efficiency since the various drive ranges can be produced with a small number of gear engagements, so that compared with vehicle drivetrains known from prior practice the fuel consumption of a drive machine of a vehicle drivetrain made with the transmission device is lower.

Owing to the arrangement of the planetary transmission device between the drive input of the drive machine and the variator, with appropriate design of the gear ratio of the planetary transmission device the torque to be transferred via the variator is reduced compared with known transmission devices, and the rotation speed is increased, whereby the load in the area of the variator is reduced. The gear ratio steps in the area of the gearshift transmission device are preferably designed such that in the frequently used overdrive ratio most of the power to be transferred by the transmission device 4 does not flow via the variator 8.

Besides the designs of the variator shown in the drawing as a belt-type or a friction-wheel variator, depending on the application concerned, other suitable structural forms of the variator can also be used to produce the functions described above.

INDEXES

1 Vehicle drivetrain
2 Drive machine
3 Starting element
4 Transmission device
5 Drive output
6 Oscillation damper
7 Planetary transmission device
8 Variator
9 Gearshift transmission device
10 Transmission output
11 First shaft of the planetary transmission device, ring gear
12 Transmission input shaft
13 Planetary gearwheel
14 Second shaft of the planetary transmission device, planetary carrier
15 Main transmission shaft
15A First part of the main transmission shaft
15B Second part of the main transmission shaft
16 Third shaft of the planetary transmission device, sun gear
17 to 19 Gearwheel
20 Spur gearing
21 First shaft of the variator
22 Second shaft of the variator
23 Countershaft
24, 25 Shift element
26 to 29 Loose wheel
30 Further countershaft
31 Gearwheel
32 Intermediate wheel
33 to 36 Gearwheel
36 Additional gearwheel
37 Further gearwheel
38 Further spur gearing
39 First spur gear
40 Second spur gear
41 to 43 Shift element
44 to 51 Loose wheel
52, 53 Hollow shaft
54 Intermediate wheel
55, 56 Shift element
57 Component fixed on the housing
58 to 60 Loose wheel
61 to 63 Gearwheel
64 Intermediate wheel
65, 66 Shift element

The invention claimed is:

1. An infinitely variable transmission device (4) for a vehicle drivetrain (1) having a variator (8) and a gearshift transmission device (9) by which gear ratios in a plurality of ratio ranges can be produced with continuous variation, and a planetary transmission device (7) comprising first, second and third shafts, the first shaft is directly coupled to and driven by a transmission input shaft (12), the second shaft is in active connection with the gearshift transmission device (9), and the third shaft drives a drive input of the variator (8), such that torque to be transmitted is transmittable via at least two power paths between the transmission input shaft (12) and a transmission output (10), the variator (8) being arranged in one of the two power paths,
the gearshift transmission device (9) being arranged between the variator (8) and the transmission output (10),
the first shaft (11) of the planetary transmission device (7) being a ring gear, and
the third shaft (16) of the planetary transmission device (7) is a sun gear and is a hollow shaft.

2. The infinitely variable transmission device according to claim 1, wherein a second end of the transmission input shaft (12) is directly connected to a starting element and the second shaft comprises a plurality of continuously connected fixed gears.

3. The infinitely variable transmission device according to claim 1, wherein the variator (8) is one of a belt-type variator and a friction-wheel variator.

4. The infinitely variable transmission device according to claim 1, wherein at least one variator shaft (21) is arranged on a main transmission shaft (15).

5. The infinitely variable transmission device according to claim 1, wherein the gearshift transmission device (9) comprises at least one coil-type transmission unit.

6. The infinitely variable transmission device according to claim 1, wherein the second shaft (14) of the planetary transmission device (7) is rotationally fixable and the torque to be transmitted in one of the drive ranges passes along only one of the power paths.

7. The infinitely variable transmission device according to claim 1, wherein the torque to be transmitted is divided, in the area of the planetary transmission device (7), between the two power paths and summed together in the gearshift transmission device (9).

8. The infinitely variable transmission device according to claim 1, wherein interlock-type shift elements (24, 25; 41, 42, 43; 56, 65, 66) are provided for shifting between the ratio ranges.

9. The infinitely variable transmission device according to claim 1, wherein the third shaft (16) of the planetary transmission device (7) is a hollow shaft and drives the input of the variator (8) via at least one spur gear stage (20).

10. The Infinitely variable transmission device according to claim 1, wherein the second shaft (14) of the planetary transmission device (7) is a planetary carrier, the third shaft is hollow and the second shaft extends coaxially through the third shaft.

11. The infinitely variable transmission device according to claim 1, wherein
the second shaft (14) is directly fixedly connected to the gearshift transmission device (9); and
the third shaft (16) is one of directly fixedly connected to the variator (8) and has a fixed gear connection with the variator (8).

12. The infinitely variable transmission device according to claim 1, wherein the second shaft (14) is directly fixedly connected to the transmission output (10).

13. The infinitely variable transmission device according to claim 1, wherein a starting element (3) couples the transmission input shaft (12) to a drive machine (2), the third shaft is a sun gear and is hollow, and the second shaft is a planetary carrier and extends through the third shaft.

14. An infinitely variable transmission device (4) for a vehicle drive train (1), the transmission device comprising:
a planetary transmission device (7) comprising first, second and third shafts (11, 14, 16),
the first shaft (11) being a ring gear directly coupled to and directly driven by a transmission input shaft (12);
a continuously variable variator (8) comprising a variator input shaft (21), being driven by the third shaft (16) of the planetary transmission device (7), and a variator output shaft (22);
a gearshift transmission device (9) comprising a main transmission shaft (15) being drivably coupled to the second shaft (14) of the planetary transmission device (7), and a countershaft (23) being coupled to and directly driven by the variator output shaft (22), and a transmission output shaft (10) being drivably coupled to the main transmission shaft (15);
the third shaft (16) of the planetary transmission device (7) and the variator (8) forming a first power path for transmitting a portion of rotational drive input by the transmission input shaft (12) into the planetary transmission device (7), and the second shaft (14) of the planetary transmission device (7) forming a second power path for transmitting a remaining portion of the rotational drive input by the transmission input shaft (12) into the planetary transmission device (7); and
the gearshift transmission device (9) being arranged between the variator (8) and the transmission output (10).

15. The infinitely variable transmission device according to claim 14, wherein the third shaft (16) of the planetary transmission device (7) is a sun gear.

16. The infinitely variable transmission device according to claim 14, wherein the second shaft (14) of the planetary transmission device (7) is a planetary carrier.

17. An infinitely variable transmission device (4) for a vehicle drivetrain (1) having a variator (8) and a gearshift transmission device (9) by which gear ratios in a plurality of ratio ranges can be produced with continuous variation, and a planetary transmission device (7) in active connection with a transmission input shaft (12), in an area of a first shaft (11), with the gearshift transmission device (9), in an area of a second shaft (14), and with the variator (8), in an area of a third shaft (16), such that torque to be transmitted is transmittable via at least two power paths between the transmission input shaft (12) and a transmission output (10),
the variator (8) being arranged in one of the two power paths,
the gearshift transmission device (9) being arranged between the variator (8) and a transmission output (10), and
the second shaft (14) of the planetary transmission device (7) being rotationally fixable and the torque to be transmitted in one of the drive ranges flowing along only one of the power paths.

* * * * *